(12) United States Patent
Cook

(10) Patent No.: X6513
(45) Date of Patent: Apr. 23, 1831

(54) CLOTH,DRESSING, WOOL & COTTON

(76) Inventor: Calvin W. Cook

Calvin W. Cook of Lowell Massachusetts.

Letters Patent.

The schedule referred to in these Letters Patent and making
part of the same, containing a description in the words of the
Calvin W. Cook himself of his Improvement in the process of dress
=ing woollen Cloths and cloths composed partly of wool and
partly of Cotton.

To all to whom these presents shall come,
Calvin Worthington Cook of Lowell in the county of Middle
-sex and common wealth of Massachusetts woollen manufac
turer sends Greeting
. Be it known that I the said Cook have invented and
applied to use a new and usefull improvement in the process of
dressing woollen Cloth and Cloths composed partly of Wool, &
partly of Cotton, the description whereof is as follows, namely; take
broad Cloths, satinets, or any like cloths to be subjected to the
process, after they have been fulled and rinsed clean, but before
the pile or nap has been raised upon them and wind them
upon wooden rollers or cylinders as tight as can be done with
out tearing the cloth, confine them with a twine tied around
so that the cloth cannot unwind and so that the whole may re-
main firm and tight upon the roller or cylinder, then prepare
a kettle or cauldron of sufficient dimensions to receive the
roller or cylinder with the cloth upon it till the kettle or caul
dron, after having put the roller or cylinder with the cloth
upon it therein with water. and apply heat thereto until
the heat rises to from one hundred & eighty to two hundred
degrees of Farenheit's thermometer for all cloths excepting
whites & Blues, and for the last-mentioned colours the heat
may be raised to two hundred & twelve degrees or to boiling
heat heat; The other colors will not endure so great a degree of heat,
the degree of heat can best be decided upon by experience
from time to time owing to the various ways of producing the
different colors in the different parts of the country, The degree
of heat above mentioned, it is believed, will in general best
answer the purpose without injury to the cloth, the water should
be kept at the degree of heat above mentioned for the space
of six hours, after which the cloth should be taken from the
water & suffered to cool upon the roller or cylinder which will
usually take about ~~twenty~~ four hours, instead of water, steam
may be applied at the same temperature for the same length
of time and will answer the same purpose: but in this case
the cloth must be wound around a revolving roller or cylinder
which must be kept continually in motion during the pro
=cess, and the steam must be confined by a wooden box
made very tight so as to include the rollers or cylinder with
the cloth upon them within it; the cloth is to be taken out
and cooled in the same way as when heated by water the
operations above mentioned, render the cloth very firm in
the bottom, divest it of wrinkles and cockles or drawn
places and render it even and smooth on the surface so
that the teazles or points may act uniformly upon the cloth
and the fibre of the wool or cloth is rendered more pliable
and is more easily turned and laid straight & smooth in
the process of teasing or raising the pile or nap thereon
And I the said Cook do hereby expressly declare that
all that I claim as new and of my invention or discovery
is the subjecting the cloth to the process aforesaid, in manner
aforesaid, and for the purposes aforesaid, after the same has
been fulled and before the pile or nap has been raised
thereon by the process of teasing.——
In testimony whereof I the said Calvin W. Cook
have hereunto set my hand and seal this first day of April, in the year of our Lord one thousand eight hundred
and thirty one Signed sealed and
Executed in the presence
of us —

Bn Rand
Augustus H. Fiske

Calvin W. Cook, [seal]

Commonwealth of Massachusetts — Suffolk ss. City of Boston
April 1st A.D. 1831 appeared the above named Calvin
W. Cook & made oath, that he does verily believe that he
is the true inventor or discoverer of his said improvement
by him above specified; and that he is a Citizen of the
United States of which sufficient testimony was produced Before me Bn Rand Justice of the peace
Co Suff Exd
WE